US012542084B2

(12) United States Patent
Ye et al.

(10) Patent No.: US 12,542,084 B2
(45) Date of Patent: Feb. 3, 2026

(54) DISPLAY DEVICE, DISPLAY PANEL AND CONTROL METHOD THEREOF

(71) Applicant: HKC CORPORATION LIMITED, Shenzhen (CN)

(72) Inventors: Zhiwei Ye, Shenzhen (CN); Xiufeng Zhou, Shenzhen (CN); Chen Chen, Shenzhen (CN); Ting Zhou, Shenzhen (CN); Lidan Ye, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 206 days.

(21) Appl. No.: 18/514,883

(22) Filed: Nov. 20, 2023

(65) Prior Publication Data

US 2025/0006101 A1 Jan. 2, 2025

(30) Foreign Application Priority Data

Jun. 30, 2023 (CN) ......................... 202310803615.7

(51) Int. Cl.
*G09G 3/20* (2006.01)
*G09G 3/294* (2013.01)
(Continued)

(52) U.S. Cl.
CPC ......... *G09G 3/2074* (2013.01); *G09G 3/2944* (2013.01); *G09G 3/296* (2013.01);
(Continued)

(58) Field of Classification Search
CPC .... G09G 3/2074; G09G 3/2944; G09G 3/296; G09G 3/3208; G09G 3/3625;
(Continued)

(56) References Cited

U.S. PATENT DOCUMENTS

2006/0221067 A1 10/2006 Kim et al.
2018/0277026 A1* 9/2018 Xu .......................... G09G 3/32
(Continued)

FOREIGN PATENT DOCUMENTS

CN 102930848 2/2013
CN 104701339 6/2015
(Continued)

OTHER PUBLICATIONS

CNIPA, First Office Action for CN Application No. 202310803615.7, Apr. 16, 2024.

(Continued)

*Primary Examiner* — Matthew A Eason
*Assistant Examiner* — Chayce R Bibbee
(74) *Attorney, Agent, or Firm* — Hodgson Russ LLP

(57) ABSTRACT

A display panel includes: a plurality of display pixel circuits each which includes a plurality of sub-display pixels and at least one anti-view pixel; and a control device electrically connected with the anti-view pixel. The control device is configured for: when the display panel runs in an anti-view mode, performing a sequential driving and a disordered driving on the anti-view pixel, wherein the sequential driving includes driving the anti-view pixels according to a sequence waveform, and the disordered driving includes driving the anti-view pixels corresponding to a disordered signal based on the disordered signal randomly generated.

15 Claims, 3 Drawing Sheets

(51) Int. Cl.
*G09G 3/296* (2013.01)
*G09G 3/3208* (2016.01)
*G09G 3/36* (2006.01)

(52) U.S. Cl.
CPC ......... *G09G 3/3208* (2013.01); *G09G 3/3625* (2013.01); *G09G 2320/068* (2013.01)

(58) Field of Classification Search
CPC ............... G09G 2320/068; G09G 3/20; G09G 2300/0439; G09F 9/335; H10K 59/12; H10K 59/121
See application file for complete search history.

(56) References Cited

U.S. PATENT DOCUMENTS

| | | | | |
|---|---|---|---|---|
| 2021/0234134 | A1 | 7/2021 | Qi et al. | |
| 2022/0199712 | A1* | 6/2022 | Park | H10K 59/8792 |
| 2022/0406851 | A1* | 12/2022 | Lee | H10K 50/865 |

FOREIGN PATENT DOCUMENTS

| | | |
|---|---|---|
| CN | 105679803 | 6/2016 |
| CN | 108490693 | 9/2018 |
| CN | 113268786 | 8/2021 |
| CN | 115171581 | 10/2022 |
| CN | 116206558 | 6/2023 |

OTHER PUBLICATIONS

CNIPA, Notification to Grant Patent Right for Invention for CN Application No. 202310803615.7, Jun. 3, 2024.

* cited by examiner

DISPLAY DEVICE, DISPLAY PANEL AND CONTROL METHOD THEREOF

CROSS-REFERENCE TO RELATED APPLICATIONS

This application claims priority to Chinese Patent Application 202310803615.7, filed Jun. 30, 2023, the entire disclosure of which is incorporated herein by reference.

TECHNICAL FIELD

The present disclosure relates to the field of displaying technologies, and more particularly, to a display panel, a control method of the display panel, and a display device.

BACKGROUND

An organic light emitting diode (OLED) display panel has the advantages like small thickness, high brightness, low power consumption, fast response, wide color gamut and so on, and thus is widely used in electronic products such as TVs, mobile phones, notebooks. With the increasingly-wide applications of the TVs, mobile phones, notebooks and other electronic products, the protection of personal information and confidential information has become a problem that cannot be ignored.

At present, the most important anti-view way is to stick an anti-view film on a surface of the display panel. The anti-view film reduces a brightness of the display panel and affects a visual effect of the display panel, and the anti-view film needs to be removed manually when the user wants to switch the display panel back to a sharing mode, which affects a sharing of the screen.

Therefore, a display panel using anti-view pixels to prevent peeping has been proposed. The display panel is provided with anti-view pixels, and the light emitted by the anti-view pixels is mixed with the light of the surrounding sub-display pixels to interfere with information reading in a wide viewing angle. In this way, the switching between an anti-view mode and the sharing mode can be realized by turning on and off the anti-view pixels, which avoids affecting the sharing of the screen. However, the interference effect caused by the light mixing between the anti-view pixels and sub-display pixels is limited, and the interference with the information reading is not reliable enough.

SUMMARY OF THE DISCLOSURE

There are provided a display panel, a control method of the display panel, and a display device according to embodiments of the present disclosure. The technical solution is as below:

According to a first aspect of embodiments of the present disclosure, there is provided a display panel including a plurality of display pixel circuits each which includes a plurality of sub-display pixels and at least one anti-view pixel;

a control device electrically connected with the anti-view pixel, configured for:

when the display panel runs in an anti-view mode, performing a sequential driving and a disordered driving on the anti-view pixel, wherein the sequential driving includes driving the anti-view pixels according to a sequence waveform, and the disordered driving includes driving the anti-view pixels corresponding to a disordered signal randomly generated.

According to a second aspect of embodiments of the present disclosure, there is provided a display device, including the above display panel and a motherboard connected with the display panel.

According to a third aspect of embodiments of the present disclosure, there is provided a control method of a display panel, including:

in response to an anti-view mode command, controlling a display panel to run in an anti-view mode, wherein when the display panel runs in the anti-view mode, performing a sequential driving and a disordered driving on anti-view pixels of the display panel, wherein the sequential driving includes driving the anti-view pixels according to a sequence waveform, and the disordered driving includes driving the anti-view pixels corresponding to a disordered signal randomly generated.

BRIEF DESCRIPTION OF THE DRAWINGS

In order to explain the technical solutions in the embodiments of the present disclosure or the prior art more clearly, the drawings used by the description of the embodiments or the prior art will be briefly introduced below. Obviously, the drawings in the following description may be merely some embodiments of the present disclosure. For those of ordinary skilled in the art, other drawings may be obtained according to the structures shown in the drawings without creative effort.

DESCRIPTION OF THE EMBODIMENTS

Figure 1:
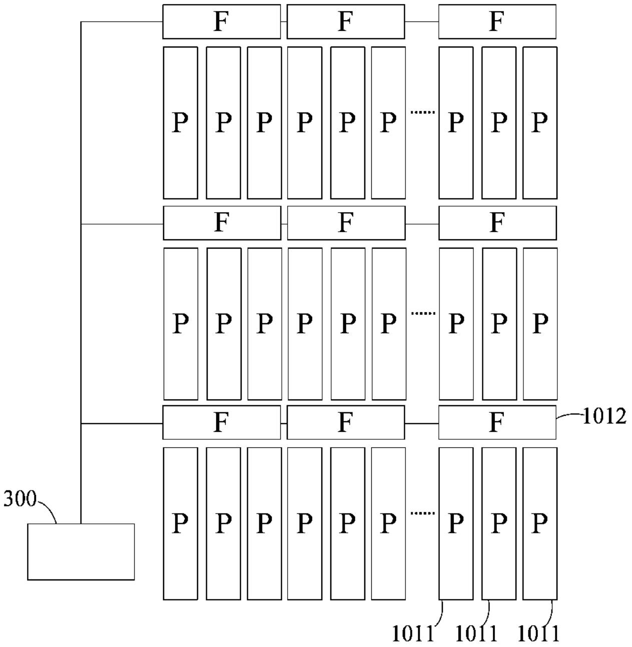
FIG. 1 is a schematic diagram of the pixel architecture of the display panel in accordance with an embodiment of the present disclosure.

Although the invention can be easily expressed in different forms of embodiments, only some specific embodiments are shown in the drawings and will be described in detail in this specification. At the same time, it can be understood that this specification should be regarded as an exemplary description of the principles of the invention, and is not intended to limit the invention to those described here.

Thus, a feature pointed out in this specification will be used to illustrate one of the features of one embodiment of the invention, rather than implying that each embodiment of the invention must have the described feature. In addition, it should be noted that this specification describes many features. Although some features can be combined to show the possible system design, these features can also be used for other unspecified combinations. Thus, unless otherwise stated, the combination stated is not intended to be restrictive.

In the embodiment shown in the drawings, the direction indication (such as up, down, left, right, front, rear, etc.) is used to explain that the structure and movement of various elements of the invention are not absolute but relative. These descriptions are appropriate when these elements are in the positions shown in the attached drawings. If the description of the position of these elements changes, the indication of these directions also changes accordingly.

The exemplary embodiments will now be described more fully with reference to the accompanying drawings. However, the exemplary embodiments can be implemented in a variety of forms, and should not be understood as limited to the examples set forth herein. On the contrary, providing these exemplary embodiments makes the description of the present invention more comprehensive and complete, and comprehensively communicates the idea of the exemplary embodiments to those skilled in the art. The attached drawings are only schematic diagrams of the present invention and are not necessarily drawn to scale. The same reference numerals in the figure denote the same or similar parts, and therefore repeated descriptions thereof will be omitted.

An embodiment of the present disclosure provides a display panel. For example, the display panel may be an organic light emitting diode (OLED) type.

As shown in FIG. 1, the display panel includes a plurality of display pixel circuits 101 and a control device 300.

Each display pixel circuit 101 includes a plurality of sub-display pixels 1011 and at least one anti-view pixel 1012.

It can be understood that the sub-display pixel 1011 may be a red sub-display pixel capable of emitting red light, a green sub-display pixel capable of emitting green light, or a blue sub-display pixel capable of emitting blue light. Each sub-display pixel 1011 may be driven to emit light, such that different colors of light emit by the sub-display pixels 1011 can be mixed to form different colors and the display panel may display colorful pictures.

In an embodiment, each sub-display pixel 1011 may be arranged to emit light independently, that is, each sub-display pixel 1011 includes a light-emitting material emitting red light, green light or blue light, and correspondingly forms an R-red sub-display pixel, a B-blue sub-display pixel, or a G-green sub-display pixel.

In an embodiment, the light color of the sub-display pixel 1011 may also be realized by using a light color conversion technology. For example, the sub-display pixel 1011 include a blue light emitting layer emitting blue light and a light color conversion layer made of light color conversion material. The blue light emitting layer may be located below a cathode layer, and the light color conversion layer may be located above the cathode layer. The light color conversion material such as quantum dots can convert the blue light emitted by the OLED into green light or red light. The blue light emitted by the blue light emitting layer can directly pass through the transparent area of the light color conversion layer without quantum dots, so as to emit blue light. Thus, the sub-display pixel 1011 can emit three primary color lights.

In an embodiment, the light color of the sub-display pixel 1011 may also be realized by using a color filter film technology, which includes an OLED emitting white light and a color filter film. The color filter film is configured to filter the white light emitted by the OLED to realize emitting three primary color lights.

In an embodiment, each display pixel circuit 101 includes three sub-display pixels 1011, which include a red sub-display pixel, a green sub-display pixel and a blue sub-display pixel, to provide the basic light of three colors. The light of three colors is mixed to obtain richer and more comprehensive colors.

Figure 4:
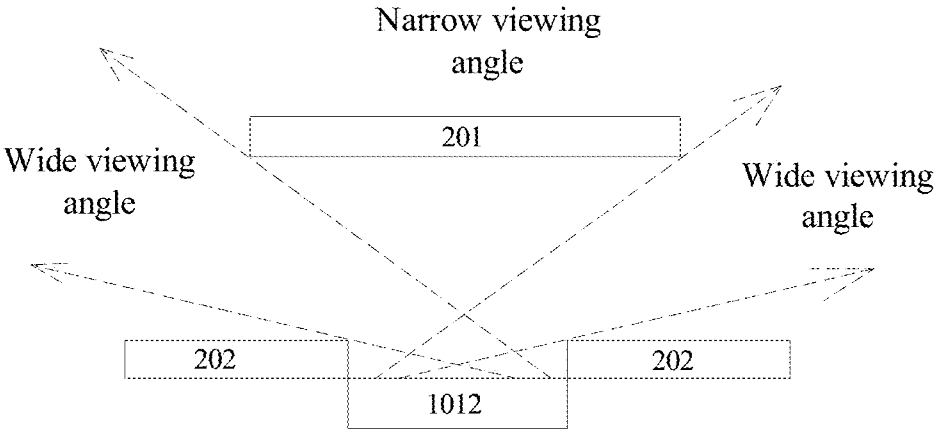
FIG. 4 is a schematic diagram showing the anti-view principle of the display panel in accordance with an embodiment of the present disclosure.

The anti-view pixel 1012 is configured to mix light with the adjacent sub-display pixel 1011 to interfere with information reading in a wide viewing angle. Referring to FIG. 4, which is a schematic diagram of the anti-view principle of the display panel, the display panel includes a first shielding part 201 and a second shielding part 202. The first shielding part 201 is located on a side of the anti-view pixel 1012 in a direction perpendicular to the display panel. Two second shielding parts 202 are arranged on a side of the anti-view pixel 1012 close to the first shielding part 201. A through hole is defined between the two second shielding parts 202, rightly corresponding to the anti-view pixel 1012. The anti-view pixel 1012 corresponds to the first shielding part 201 along the through hole. In this way, when the display panel is switched to an anti-view mode, the anti-view pixel 1012 is lighted, and the light of the anti-view pixel 1012 in the direction perpendicular to the display panel is blocked by the first shielding part 201. The picture effect is not interfered by the light of anti-view pixel 1012 within a narrow viewing angle range as shown in FIG. 4. However, a part of the light of the anti-view pixel 1012 is emitted obliquely from an edge of the first shielding part 201, thus, due to the light mixing between the anti-view pixel 1012 and the sub-display pixel 1011, the display panel displays different colors within a wide viewing angle range, which interferes with the picture effect within a wide viewing angle range as shown in FIG. 4, and interferes with the information reading on the screen by the peeper within a wide viewing angle range. When the display panel is switched to a sharing mode, the anti-view pixel 1012 is turned off such that the wide viewing angle area is not interfered by the light of the anti-view pixel 1012, and the screen information can be read in both the narrow viewing angle range and the wide viewing angle range.

In an embodiment, the first shielding part 201 may be a black matrix.

In an embodiment, the second shielding part 202 may be a black matrix.

In order to achieve the light mixing effect between the anti-view pixel 1012 and the adjacent sub-display pixel 1011, in an embodiment, the light color of the anti-view pixel 1012 is different from that of the adjacent sub-display pixel 1011.

In the display pixel circuit 101 with the anti-view pixel 1012, the anti-view pixel 1012 may be arranged at one end of the other sub-display pixels 1011 along a horizontal arrangement direction. The anti-view pixel 1012 is arranged horizontally (or vertically) in parallel with the other three sub-display pixels 1011.

In an embodiment, referring to the schematic diagram of the pixel architecture of the display panel shown in FIG. 1, in the display pixel circuit 101 with the anti-view pixel 1012, the anti-view pixel 1012 may be vertically arranged on one side of the other sub-display pixels 1011 in the arrangement direction. For example, the other three sub-display pixels 1011 are arranged in parallel along the horizontal direction, and the anti-view pixel 1012 is arranged on an upper side (or lower side) of the other three sub-display pixels 1011.

In other embodiments, the anti-view pixel 1012 may also be arranged among the sub-display pixels 1011 in the display pixel circuit 101.

In an embodiment, the anti-view pixel 1012 is located between two adjacent sub-display pixels 1011 when the multiple display pixel circuits 101 are arranged in an array.

In this way, the light emitted by the anti-view pixel 1012 may be mixed with the light of at least two adjacent sub-display pixels 1011, which can realize the anti-view effect while saving the number of anti-view pixels 1012 and further reduce the power consumption of the display panel.

The control device 300 is electrically connected with the anti-view pixel 1012. The control device 300 is configured for, when the display panel runs in the anti-view mode, performing a sequential driving and a disordered driving on the anti-view pixel 1012. The sequential driving includes driving the anti-view pixel 1012 according to a sequence waveform, and the disordered driving includes driving the anti-view pixel 1012 corresponding to a disordered signal randomly generated.

In this way, when the display panel runs in the anti-view mode, during the sequential driving process of the anti-view pixels 1012, the light of the anti-view pixels 1012 may be used to interfere with the information reading in a wide viewing angle of the display panel. At the same time, during the sequential driving process, a part of the anti-view pixels 1012 are randomly turned on based on the disordered signal, which can break the adaptability of the peeper to the light changes of the anti-view pixels 1012 and improve the interference effect with the information reading. Moreover, the attention of the peeper is more likely to be attracted by the light of the anti-view pixels 1012 which are randomly turned on, which can control the human eye and thus form a better anti-view effect. In can be understood that in the single anti-view mode which only the light of anti-view pixels and that of the sub-display pixels are mixed, since the displayed pictures remain unchanged for a long time, the peeper is easy to adapt to the light of mixing colors and is capable of reading the picture information. In this embodiment, the anti-pixel is randomly turned on to break the adaptability of the peeper and thus improve the anti-view effect.

Figure 5:
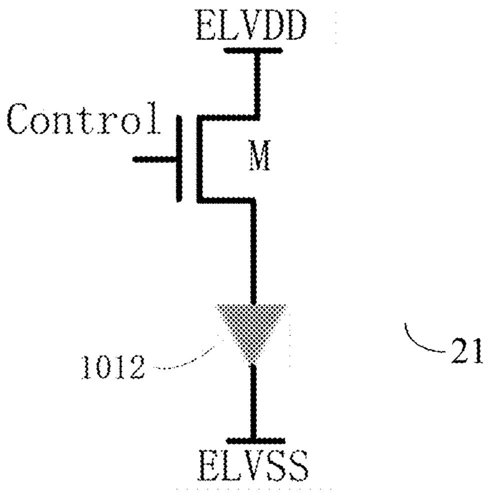
FIG. 5 is a circuit schematic diagram of an anti-view pixel in accordance with an embodiment of the present disclosure.

As shown in FIG. 5, the anti-view pixel 1012 is controlled to be turned on or off by an anti-view pixel circuit. For example, the anti-view pixel circuit includes an anti-view switch tube M. A first end of the anti-view switch tube M is electrically connected with a power supply voltage line ELVDD of the display panel, and a second end of the anti-view switch tube M is electrically connected with a common ground voltage line ELVSS of the display panel through the anti-view pixel 1012. The anti-view switch tube M further includes a control end Control electrically connected with the control device 300, such that the anti-view switch tube M may be turned on or turned off under the driving of the control device 300 to correspondingly turn on the anti-view pixel 1012 when the anti-view switch tube M is turned on and turn off the anti-view pixel 1012 when the anti-view switch tube M is turned off. The circuit structure of the anti-view pixel circuit is simple, which can better reduce the cost of the product, and is also beneficial to efficient signal transmission. In this way, the control device 300 drives the anti-view pixel 1012 more accurately according to the disordered signal. In case of that the anti-view pixels 1012 are lighted by the driving of the sequence waveform and lighted by the driving of the disordered signal, it is more easy to be differentiated in lighting times and/or brightness, which can better attract the attention of the peeper.

In an embodiment, the anti-view switch tube M may be a thin film transistor (TFT).

In one embodiment, the sequence waveform includes a plurality of first pulses arranged at intervals in time sequence, and the disordered signal includes a second pulse randomly generated. The random generation of the second pulse includes:

randomly generating at least one second pulse and embedding the second pulse in the sequence waveform. The second pulse is embedded in the sequence waveform before the first pulse of the sequence waveform, and/or the second pulse is embedded between two adjacent first pulses of the sequence waveform.

For example, in the line-by-line scanning process of the anti-view pixels of the display panel, the second pulse is embedded in the sequence waveform of at least one row of the anti-view pixels, and the second pulse is embedded before the first pulse of the sequence waveform, or the second pulse is embedded between two adjacent first pulses of the sequence waveform. Correspondingly, the second pulse is not embedded in the sequence waveform of the anti-view pixels in the remaining rows.

In this way, for the sequence waveform without the second pulse, the control device 300 drives the anti-view pixel 1012 through each first pulse in time sequence. For example, the control device 300 lights the anti-view pixel 1012 through the first pulse. For the sequence waveform embedded with the second pulse, the control device 300 drives the anti-view pixel 1012 through the first pulse and the second pulse in time sequence. For example, when the current output waveform is the first pulse, the control device 300 lights the anti-view pixel 1012 through the first pulse; when the current output waveform is the second pulse, the control device 300 lights the anti-view pixel 1012 through the second pulse. Thus, compared with the line-by-line scanning in which the second pulse is not embedded in the sequence waveform, for the line-by-line scanning in which the second pulse is embedded in the sequence waveform, the lighting frequency of the anti-view pixels is irregular. Furthermore, a part of the anti-view pixels are randomly lighted and thus the positions of the lighted anti-view pixels on the display panel are also irregular. Since a part of the anti-view pixels are randomly lighted at different times and the lighted anti-view pixels are located in different rows at each time, the effect of random position and random flick is formed, which can further attract the attention of the peeper and improve the anti-view effect. In addition, the configuration can be better compatible with the traditional anti-view pixel driving circuit without too much modifications of the control device 300 and the anti-view pixel driving circuit, which can save the cost.

In the case that at least one second pulse is generated and embedded in the sequence waveform, the second pulse may be embedded before the first pulse of the sequence waveform, or embedded between two adjacent first pulses of the sequence waveform. In a previous period of time, the anti-view pixel 1012 is randomly lighted by the second pulse, and the human eye is attracted to focus on the position of the lighted anti-view pixel 1012, which can better attract the attention of the human eye and realize visual follow-up or eye control. In a later period of time, the anti-view pixel 1012 is lighted by the first pulse and the light from the lighted anti-view pixel 1012 is used to mix with the light of the sub-display pixel 1011 for forming the overall anti-view effect. At this time, since the attention of the peeper has been attracted to the randomly-lighted anti-view pixel 1012 in the previous period of time, a visual segment difference for the peeper is formed when the first pulse lights the anti-view pixel 1012 in the later period of time, thus, the peeper needs to re-adapt to the light mixing between the anti-view pixel 1012 and the sub-display pixel 1011, which prolongs the interference effect provided by the light mixing between the anti-view pixel 1012 and the sub-display pixel 1011, and thus improves the light mixing interference effect of the anti-view pixel 1012 and the sub-display pixel 1011.

In an embodiment, a the anti-view pixels 1012 of the display panel are arranged to form a plurality of row-wise anti-view arrays. Each row-wise anti-view array 102 includes a plurality of row-wise anti-view pixels 1012 arranged at intervals. Performing the sequential driving and the disordered driving on the anti-view pixels 1012 includes: during the line-by-line scanning process of the row-wise anti-view array based on the sequence waveform, when at least one second pulse is embedded in the sequence waveform, driving the anti-view pixels 1012 in the row-wise anti-view array by the first pulse and the second pulse in the sequence waveform in time sequence: when the second pulse is not embedded in the sequence waveform, driving the anti-view pixels 1012 in the row-wise anti-view array by the first pulse in the sequence waveform in time sequence.

That is, in this embodiment, in the anti-view pixels 1012 which correspond to the randomly-generated disordered signal and are driven by the disordered signal, the anti-view pixel 1012 corresponding to the disordered signal can be substantially understood as the anti-view pixel 1012 in the row-wise anti-view array. It can be understood that in this embodiment, when the sequential driving is performed, the first pulse drives the anti-view pixels 1012 in the row-wise anti-view array in time sequence, and when the disordered driving is performed, the second pulse drives the anti-view pixels 1012 in the row-wise anti-view array in time sequence. Since the second pulse is embedded before the first pulse or between two adjacent first pulses, which is set to be embedded between two adjacent first pulses in this embodiment, the second pulse randomly appears at a time when the first pulse does not appear, breaking the sequential driving frequency of the row-wise anti-view array. Therefore, the attention of the peeper can be attracted and the anti-view effect is thus improved. Furthermore, the configuration in this embodiment can be better compatible with the traditional anti-view pixel driving circuit without requiring too much modifications of the control device 300 and the anti-view pixel driving circuit, which can save the cost.

Figure 3:
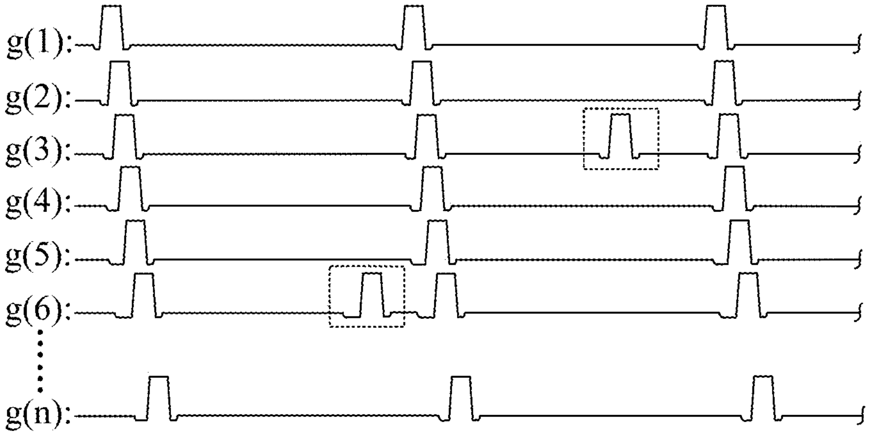
FIG. 3 is a diagram of a waveform output by the control device in accordance with an embodiment of the present disclosure.

Referring to FIG. 3, which is the diagram of the output waveforms of the control device 300. g(1), g(2), g(3), g(4), g(5), g(6) . . . g(n) correspondingly show the sequence waveforms of the row-wise anti-view arrays in the first row to the n-th row of the display panel. The pulse located in the dotted line box is the second pulse, and the pulse not located in the dotted line box is the first pulse. Thus, the second pulses of the disordered signal are embedded in g(3) and g(6), accordingly controlling the row-wise anti-view arrays in the third row and the sixth row to light the corresponding anti-view pixels 1012 at the duration of the second pulse. In this way, the positions of the lighted row-wise anti-view arrays are different at different times, which can further improve the effect of attracting the attention of the peeper.

In another example, the anti-view pixels 1012 of the display panel are arranged to form a plurality of row-wise anti-view arrays. Each row-wise anti-view array includes a plurality of row-wise anti-view pixels 1012 arranged at intervals. At least one or more anti-view pixels 1012 in one row-wise anti-view array are preset target pixels. Performing the sequential driving and the disordered driving on the anti-view pixels 1012 includes:

in the line-by-line scanning process of the row-wise anti-view array based on the sequence waveform, detecting the disordered signal by the preset target pixels and emitting light in response to the detected disordered signal.

Thus, in the line-by-line scanning process, when the disordered signal is detected at the current time, the preset target pixel of the current row is lighted to form a random lighting effect. Taking the disordered signal including the second pulse and the sequence waveform including the first pulse as an example, signal strengths of the second pulse and the first pulse can be set to be different from each other. For example, the signal strength of the second pulse is less than that of the first pulse. At least one preset target pixel and at least one anti-view pixel 1012 are included in the same row-wise anti-view array, if the current waveform is the first pulse, the preset target pixel and the anti-view pixel 1012 are turned on in response to the first pulse: if the current waveform is the second pulse, the preset target pixel is turned on in response to the second pulse while the anti-view pixel 1012 cannot be turned on due to the small signal strength of the second pulse. At this time, the lighted preset target pixel forms a local bright spot, which can effectively attract the attention of the peeper and save power.

Figure 2:
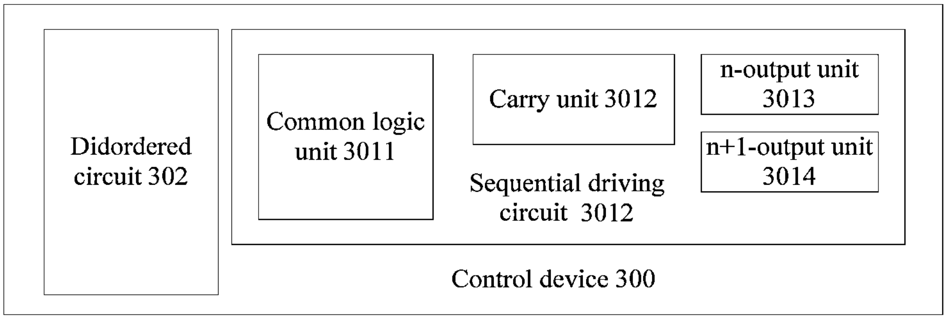
FIG. 2 is a block diagram of a control device in accordance with an embodiment of the present disclosure.

Referring to FIG. 2, which is a schematic block diagram of the control device 300, the control device 300 includes a sequential driving circuit 301 and a disordered circuit 302.

The sequential driving circuit 301 is configured to generate and output the sequence waveform. For example, the sequential driving circuit 301 includes a common logic unit 3011, a carry unit 3012, and several output units (e.g., an n-output unit 3013, an n+1-output unit 3013). Each output unit is configured to be electrically connected with the corresponding row line, the signal output by the common logic unit 3011 is transmitted to the corresponding row line through the output unit, and the carry unit 3012 is configured to generate a carry signal to the next stage as a resetting signal or a setting signal.

In an embodiment, the sequential driving circuit 301 is a gate driven on array (GOA).

The disordered circuit 302 is electrically connected with the sequential driving circuit 301 to randomly generate the disordered signal and output the disordered signal through the sequential driving circuit 301. For example, the disordered circuit 302 is configured to form the second pulse and transmit the second pulse to the corresponding row line through the output unit 3013.

The control device 300 can be obtained by configuring the disordered circuit 302 (also known as a disordered waveform generation unit) on the GOA. The GOA is driven in time sequence, that is, driven according to the sequence waveform. The anti-view pixel 1012 is controlled by configuring the disordered circuit 302 on a power supply of the GOA to generate a disordered waveform (such as the second pulse) at the display blank time (that is, the time between adjacent first pulses). Thus, the control device 300 of the present disclosure has the advantages of simple structure and low transformation cost.

Furthermore, the control device 300 is also electrically connected with a plurality of sub-display pixels 1011 of the display pixel circuit 101 for driving the sub-display pixels 1011. In this way, the sub-display pixels 1011 and the anti-view pixels 1012 share the same control device 300, which is beneficial to the simplification and integration of product components and reduces the cost of the product.

Figure 6:
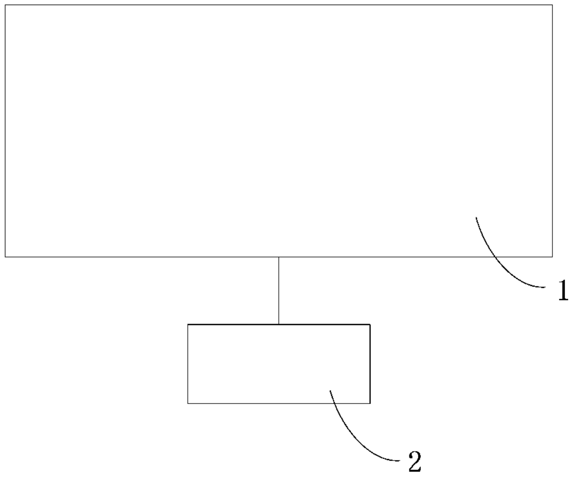
FIG. 6 is a schematic diagram of a display device in accordance with an embodiment of the present disclosure.

As shown in FIG. 6, the present disclosure further provides a display device, which includes a display panel 1 and a motherboard 2. The motherboard 2 is connected with the display panel 1 to drive the display panel 1 to display pictures. The display panel 1 can be one described in any of the above embodiments.

Figure 7:
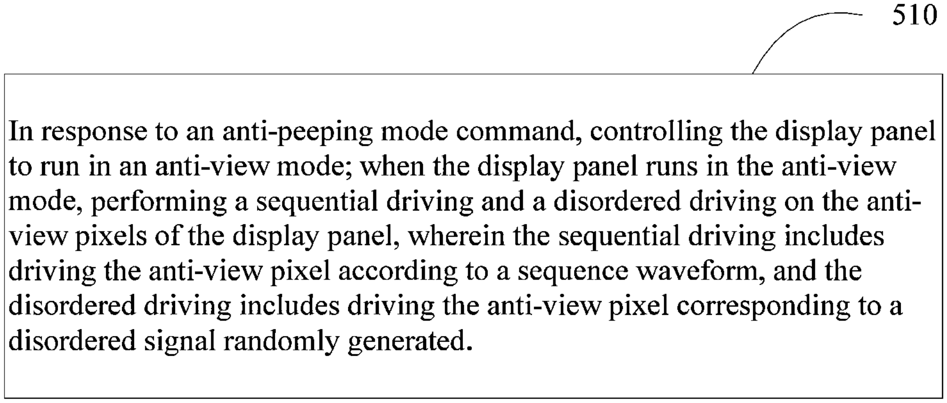
FIG. 7 is a flowchart of a control method of the display panel in accordance with an embodiment of the present disclosure.

As shown in FIG. 7, the present disclosure further provides a control method of the display panel. It can be understood that the control method can be applied to the display panel described in any of the above embodiments.

The display panel includes a plurality of display pixel circuits and a control device, and each display pixel circuit includes a plurality of sub-display pixels and at least one anti-view pixel: and the control device is electrically connected with the anti-view pixel.

The control method includes the steps as follows.

Step S510, in response to an anti-view mode command, controlling the display panel to run in an anti-view mode; when the display panel runs in the anti-view mode, performing a sequential driving and a disordered driving on the anti-view pixels of the display panel. The sequential driving includes driving the anti-view pixel according to a sequence waveform, and the disordered driving includes driving the anti-view pixel corresponding to a disordered signal based on the disordered signal randomly generated.

When the display panel is running in the anti-view mode, the sequential driving and the disordered driving are performed on the anti-view pixels. In the sequential driving process, the light of the anti-view pixel can be used to interfere with the information reading of the display panel in a wide viewing angle. At the same time, a part of the anti-view pixels are turned on randomly based on the disordered signal, which breaks the adaptability of the peeper to the light changes of the anti-view pixels during the sequential driving process and thus improves the interference effect with the information reading to the peeper. Furthermore, the attention of the peeper is more likely to be attracted by the light of the anti-view pixels which are randomly turned on, achieving an effect of controlling the human eye and forming a better anti-view effect.

The above descriptions are only optional embodiments of the application, and do not limit the scope of the patents of the present application. All the equivalent structural transformations made by the content of the specification and drawings of the present application under the creative concept of the present application, or directly/indirectly used in other related technical fields are all comprised in the protection scope of the patents of the present application.

What is claimed is:

1. A display panel, comprising:

a plurality of display pixel circuits each which comprises a plurality of sub-display pixels and at least one anti-view pixel; and a control device electrically connected with the at least one anti-view pixel, configured to:

when the display panel runs in an anti-view mode, performing a sequential driving and a disordered driving on the at least one anti-view pixel, wherein the sequential driving comprises driving the at least one anti-view pixel according to a sequence waveform, and the disordered driving comprises driving the at least one anti-view pixel corresponding to a disordered signal based on the disordered signal randomly generated;

wherein the sequence waveform comprises a plurality of first pulses arranged at intervals in time sequence, the disordered signal comprises a second pulse randomly generated, and the second pulse is generated by:

randomly generating at least one second pulse and embedding the second pulse in the sequence waveform, wherein the second pulse is embedded before a first pulse of the sequence waveform, and/or the second pulse is embedded between two adjacent first pulses of the sequence waveform.

2. The display panel according to claim 1, wherein the at least one anti-view pixel comprises a plurality of anti-view pixels arranged to form a plurality of row-wise anti-view arrays, and each row-wise anti-view array comprises a plurality of row-wise anti-view pixels arranged at intervals, wherein performing the sequential driving and the disordered driving on the at least one anti-view pixel comprises:

driving, by the plurality of first pulses and the second pulse in the sequence waveform, the plurality of anti-view pixels in the plurality of row-wise anti-view arrays sequentially, when the second pulse is embedded in the sequence waveform during a line-by-line scanning process of each row-wise anti-view array based on the sequence waveform; or driving, by the first pulse in the sequence waveform, the plurality of anti-view pixels in the plurality of row-wise anti-view arrays in the time sequence, when the second pulse is not embedded in the sequence waveform.

3. The display panel according to claim 1, wherein the at least one anti-view pixel comprises a plurality of anti-view pixels arranged to form a plurality of row-wise anti-view arrays, and each row-wise anti-view array comprises a plurality of row-wise anti-view pixels arranged at intervals, wherein one or more of the plurality of anti-view pixels in at least one of the plurality of row-wise anti-view arrays are preset target pixels, and performing the sequential driving and the disordered driving on the at least one anti-view pixel comprises:

detecting the disordered signal by the preset target pixels and emitting light in response to the detected disordered signal during a line-by-line scanning process of each row-wise anti-view array based on the sequence waveform.

4. The display panel according to claim 1, wherein the control device comprises:

a sequential driving circuit configured to generate and output the sequence waveform; and a disordered circuit electrically connected to the sequential driving circuit, configured to randomly generate the disordered signal and output the disordered signal through the sequential driving circuit.

5. The display panel according to claim 1, wherein the control device is further electrically connected to the plurality of sub-display pixels in the plurality of display pixel circuits for driving the plurality of sub-display pixels.

6. The display panel according to claim 1, wherein the at least one anti-view pixel is located between two adjacent sub-display pixels.

7. A display device, comprising a display panel and a motherboard connected to the display panel, wherein the display panel comprises:

a plurality of display pixel circuits each which comprises a plurality of sub-display pixels and at least one anti-view pixel; and a control device electrically connected with the at least one anti-view pixel, configured to:

when the display panel runs in an anti-view mode, performing a sequential driving and a disordered driving on the at least one anti-view pixel, wherein the sequential driving comprises driving the at least one anti-view pixel according to a sequence waveform, and the disordered driving comprises driving the at least one anti-view pixel corresponding to a disordered signal based on the disordered signal randomly generated;

wherein the sequence waveform comprises a plurality of first pulses arranged at intervals in time sequence, the disordered signal comprises a second pulse randomly generated, and the second pulse is generated by:

randomly generating at least one second pulse and embedding the second pulse in the sequence waveform, wherein the second pulse is embedded before a first pulse of the sequence waveform, and/or the second pulse is embedded between two adjacent first pulses of the sequence waveform.

8. The display device according to claim 7, wherein the at least one anti-view pixel comprises a plurality of anti-view pixels are arranged to form a plurality of row-wise anti-view arrays, and each row-wise anti-view array comprises a plurality of row-wise anti-view pixels arranged at intervals, wherein performing the sequential driving and the disordered driving on the at least one anti-view pixel comprises:

driving, by the plurality of first pulses and the second pulse in the sequence waveform, the plurality of anti-view pixels in the plurality of row-wise anti-view arrays sequentially, when the second pulse is embedded in the sequence waveform during a line-by-line scanning process of each row-wise anti-view array based on the sequence waveform; or driving, by the first pulse in the sequence waveform, the plurality of anti-view pixels in the plurality of row-wise anti-view arrays in the time sequence, when the second pulse is not embedded in the sequence waveform.

9. The display device according to claim 7, wherein the at least one anti-view pixel comprises a plurality of anti-view pixels are arranged to form a plurality of row-wise anti-view arrays, and each row-wise anti-view array comprises a plurality of row-wise anti-view pixels arranged at intervals, wherein one or more of the plurality of anti-view pixels in at least one of the plurality of row-wise anti-view arrays are preset target pixels, and performing the sequential driving and the disordered driving on the at least one anti-view pixel comprises:

detecting the disordered signal by the preset target pixels and emitting light in response to the detected disordered signal during a line-by-line scanning process of each row-wise anti-view array based on the sequence waveform.

10. The display device according to claim 7, wherein the control device comprises:

a sequential driving circuit configured to generate and output the sequence waveform; and a disordered circuit electrically connected to the sequential driving circuit, configured to randomly generate the disordered signal and output the disordered signal through the sequential driving circuit.

11. The display device according to claim 7, wherein the control device is further electrically connected to the plurality of sub-display pixels in the plurality of display pixel circuits for driving the plurality of sub-display pixels.

12. The display device according to claim 7, wherein the at least one anti-view pixel is located between two adjacent sub-display pixels.

13. A control method of a display panel, comprising:

in response to an anti-view mode command, controlling the display panel to run in an anti-view mode, wherein when the display panel runs in the anti-view mode, performing a sequential driving and a disordered driving on anti-view pixels of the display panel, wherein the sequential driving comprises driving the anti-view pixels according to a sequence waveform, and the disordered driving comprises driving the anti-view pixels corresponding to a disordered signal based on the disordered signal randomly generated;

wherein the sequence waveform comprises a plurality of first pulses arranged at intervals in time sequence, the disordered signal comprises a second pulse randomly generated, and the second pulse is generated by:

randomly generating at least one second pulse and embedding the second pulse in the sequence waveform, wherein the second pulse is embedded before a first pulse of the sequence waveform, and/or the second pulse is embedded between two adjacent first pulses of the sequence waveform.

14. The method according to claim 13, wherein the anti-view pixels of the display panel are arranged to form a plurality of row-wise anti-view arrays, and each row-wise anti-view array comprises a plurality of row-wise anti-view pixels arranged at intervals, wherein performing the sequential driving and the disordered driving on the anti-view pixels comprises:

driving, by the plurality of first pulses and the second pulse in the sequence waveform, the anti-view pixels in the plurality of row-wise anti-view arrays sequentially, when the second pulse is embedded in the sequence waveform during a line-by-line scanning process of each row-wise anti-view array based on the sequence waveform; or driving, by the first pulse in the sequence waveform, the anti-view pixels in the plurality of row-wise anti-view arrays in the time sequence, when the second pulse is not embedded in the sequence waveform.

15. The method according to claim 13, wherein the anti-view pixels of the display panel are arranged to form a plurality of row-wise anti-view arrays, and each row-wise anti-view array comprises a plurality of row-wise anti-view pixels arranged at intervals, wherein one or more of the anti-view pixels in at least one of the plurality of row-wise anti-view arrays are preset target pixels, and performing the sequential driving and the disordered driving on the anti-view pixels comprises:

detecting the disordered signal by the preset target pixels and emitting light in response to the detected disordered signal during a line-by-line scanning process of each row-wise anti-view array based on the sequence waveform.

* * * * *